(12) United States Patent
Park et al.

(10) Patent No.: US 7,661,822 B2
(45) Date of Patent: Feb. 16, 2010

(54) PROJECTION APPARATUS FOR VEHICLE

(75) Inventors: Mi Sun Park, Pusan (KR); Il Sun Kim, Gwangmyung (KR)

(73) Assignee: Korea Railroad Corporation (KP)

( * ) Notice: Subject to any disclaimer, the term of this patent is extended or adjusted under 35 U.S.C. 154(b) by 235 days.

(21) Appl. No.: 11/956,155

(22) Filed: Dec. 13, 2007

(65) Prior Publication Data

US 2008/0259225 A1 Oct. 23, 2008

(30) Foreign Application Priority Data

Apr. 19, 2007 (KR) .................... 10-2007-0038413

(51) Int. Cl.
    *G03B 21/14* (2006.01)
(52) U.S. Cl. ...................................... 353/13
(58) Field of Classification Search .............. 353/11, 353/12, 13, 79
    See application file for complete search history.

(56) References Cited

U.S. PATENT DOCUMENTS

| | | | |
|---|---|---|---|
| 5,281,985 A * | 1/1994 | Chan ........................ | 353/13 |
| 5,580,140 A * | 12/1996 | Katz et al. .................. | 353/13 |
| 5,775,762 A | 7/1998 | Vitito | |
| 6,733,133 B2 * | 5/2004 | Egle et al. .................. | 353/13 |
| 6,736,516 B1 * | 5/2004 | Kepley et al. ............... | 353/79 |
| 7,036,936 B2 * | 5/2006 | Hattori et al. ............... | 353/13 |
| 7,275,832 B2 * | 10/2007 | Sato .......................... | 353/13 |
| 2008/0165325 A1 * | 7/2008 | Vaylagya .................... | 353/13 |

FOREIGN PATENT DOCUMENTS

| | | |
|---|---|---|
| DE | 102 26 405 | 7/2003 |
| KR | 20-1997-0026295 | 6/1997 |
| KR | 20-1999-0011647 | 3/1999 |
| KR | 10-2001-0045339 | 5/2001 |

* cited by examiner

*Primary Examiner*—William C. Dowling

(57) ABSTRACT

A projection apparatus for a vehicle of the present invention includes a projector for projecting an image onto a screen, a support bracket supporting the projector, a frame attached to a ceiling of the vehicle, and a vibration absorber arranged between the support bracket and the frame. The vibration absorber includes a plurality of wire ropes for absorbing multidirectional vibrations transmitted from the vehicle through the frame to the projector. Accordingly, this prevents the projector from shaking so that passengers can comfortably watch video content, and also reduces the incidence of breakage of components of the projector, thereby prolonging the lifetime of the projector.

4 Claims, 5 Drawing Sheets

PROJECTION APPARATUS FOR VEHICLE

BACKGROUND OF THE INVENTION

1. Field of the Invention

The present invention relates to a projection apparatus for a vehicle, and more particularly, to a projection apparatus for a vehicle that can absorb vibrations occurring in various directions when the vehicle is being driven, thereby preventing an image, which is projected onto a screen, from shaking.

2. Description of Related Art

Recently, as a way to provide a passenger or passengers with convenient and comfortable travel, a display device, such as a television or a disk player, is provided in a vehicle so that the passengers can watch video content.

For example, a disk player is provided in a passenger car so that passengers can watch video content or listen to music. In the case of a large size bus, a television and a disk player are provided on the ceiling of the bus near the driver's seat so that passengers can watch video content or listen to music.

However, in the passenger vehicle or the large size bus, the passengers cannot watch video content on a large size screen.

On the other hand, trains are free from such restrictions. That is, a projection apparatus, such as a projector for projecting an image onto a screen, particularly a large size screen, can be installed in a train car. Accordingly, the passengers can enjoy long trips watching a movie on the large size screen.

In the train car, vibration pads made of rubber or silicone are provided between the projector and the ceiling of the train car in order to absorb vibration of the projection apparatus, caused by shaking, while the train car is moving.

Conventional vibration-proof elements such as those noted above have pads made of rubber or silicone. However, as time passes, the pads come to lose their intrinsic function for various reasons such as hardening, and thus vibrations are transmitted to the projector, thereby causing components of the projector to break down or causing the fixing device of the projector to become detached.

Accordingly, in order to overcome the foregoing problem, the inventor has developed a screen apparatus for a vehicle having a vibration absorber in the form of a wire rope between the projector and the ceiling of a vehicle.

SUMMARY OF THE INVENTION

Therefore an object of the present invention is to provide a projection apparatus for a vehicle that can absorb multidirectional vibration, transmitted to a projector, in order to prevent the projector from shaking so that passengers can comfortably watch video content as well as to reduce the incidence of breakage of components of the projector, thereby prolonging the lifetime of the projector.

In order to realize the foregoing object the projection apparatus for a vehicle of the present invention includes a projector for projecting an image onto a screen, a support bracket supporting the projector, a frame attached to the ceiling of the vehicle, and a vibration absorber disposed between the support bracket and the frame, the vibration absorber including a plurality of wire ropes for absorbing multidirectional vibrations which are transmitted from the vehicle through the frame to the projector.

Preferably, the vibration absorber further includes a first mount block fixed to the support bracket and a second mount block fixed to the frame, and the wire ropes having an annular shape elastically connect the first mount block with the second mount block.

Preferably, the wire ropes may be made of stainless steel to enhance corrosion resistance and endurance so that they can be used semi-permanently.

According to the present invention as set forth above, the vibration absorber comprises wire ropes between the support frame, supporting the projector, and the frame attached to the ceiling of the vehicle, so that the wire ropes can absorb multidirectional vibrations, which are transmitted from the ceiling of the vehicle through the frame to the projector, thereby ensuring that the projector does not shake. Accordingly, passengers can comfortably watch video content, and the incidence of breakage of components of the projector is reduced, thereby prolonging the lifetime of the projector.

DETAILED DESCRIPTION OF THE INVENTION

The present invention will now be described in detail with reference to the accompanying drawings.

Prior to presenting the detailed description, an exemplary embodiment of a projection apparatus according to the present invention, installed in a train car, will be described.

Figure 1:
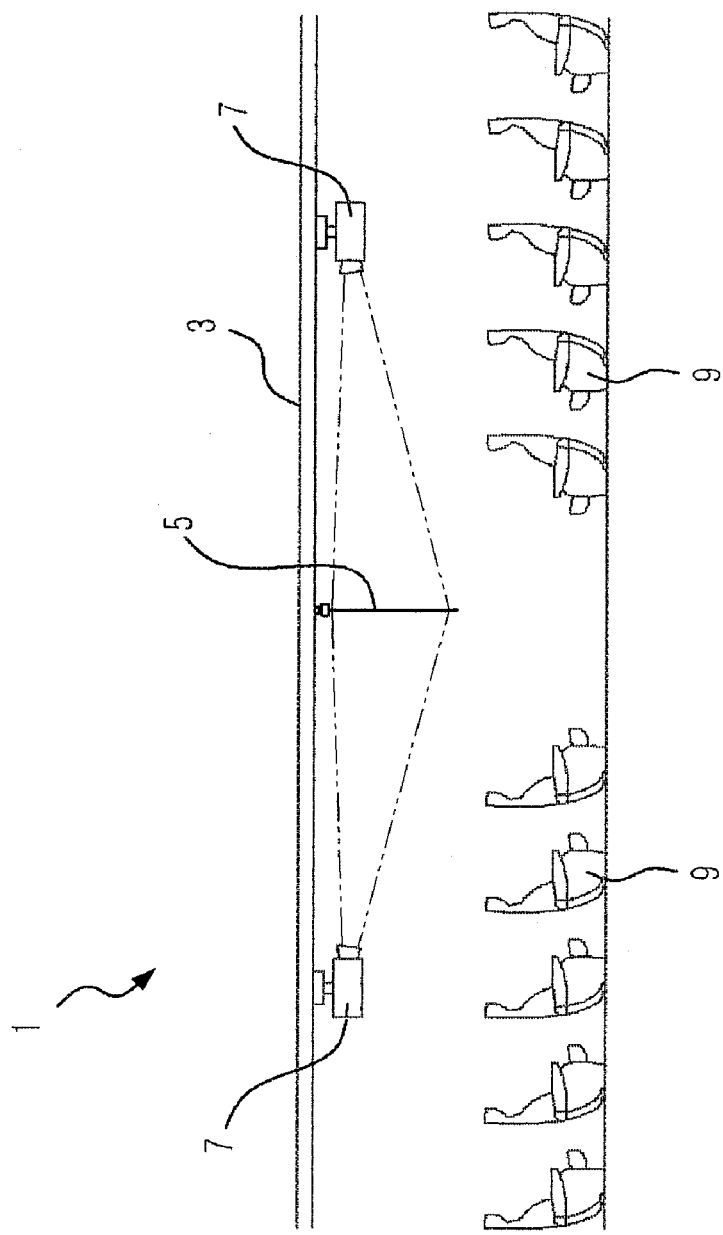
FIG. 1 is a conceptual view illustrating the usage of a projection apparatus for a vehicle according to the present invention, which is used in a car of a train.
Figure 2:
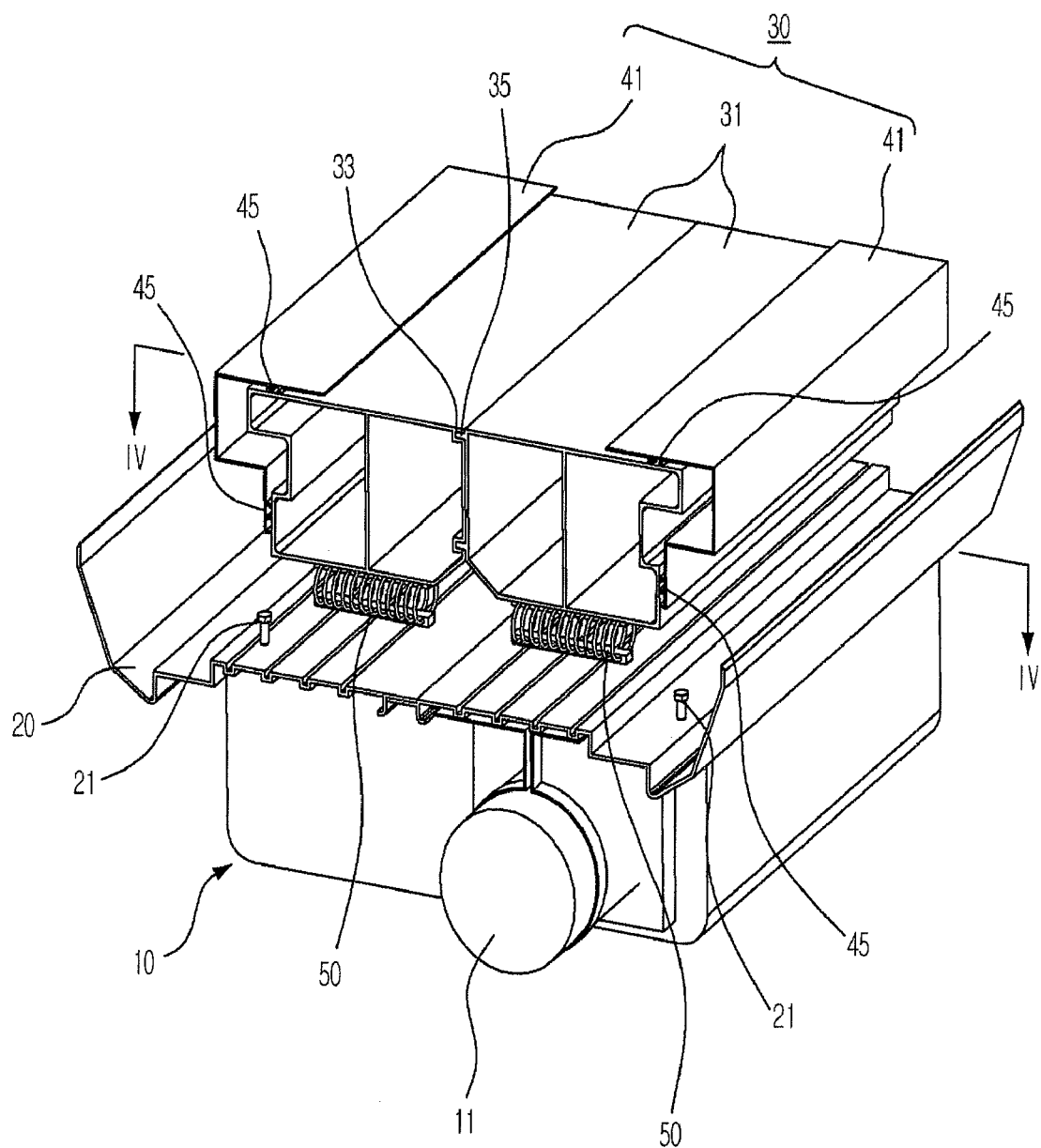
FIG. 2 is a perspective view illustrating the projection apparatus for a vehicle according to the present invention.
Figure 3:
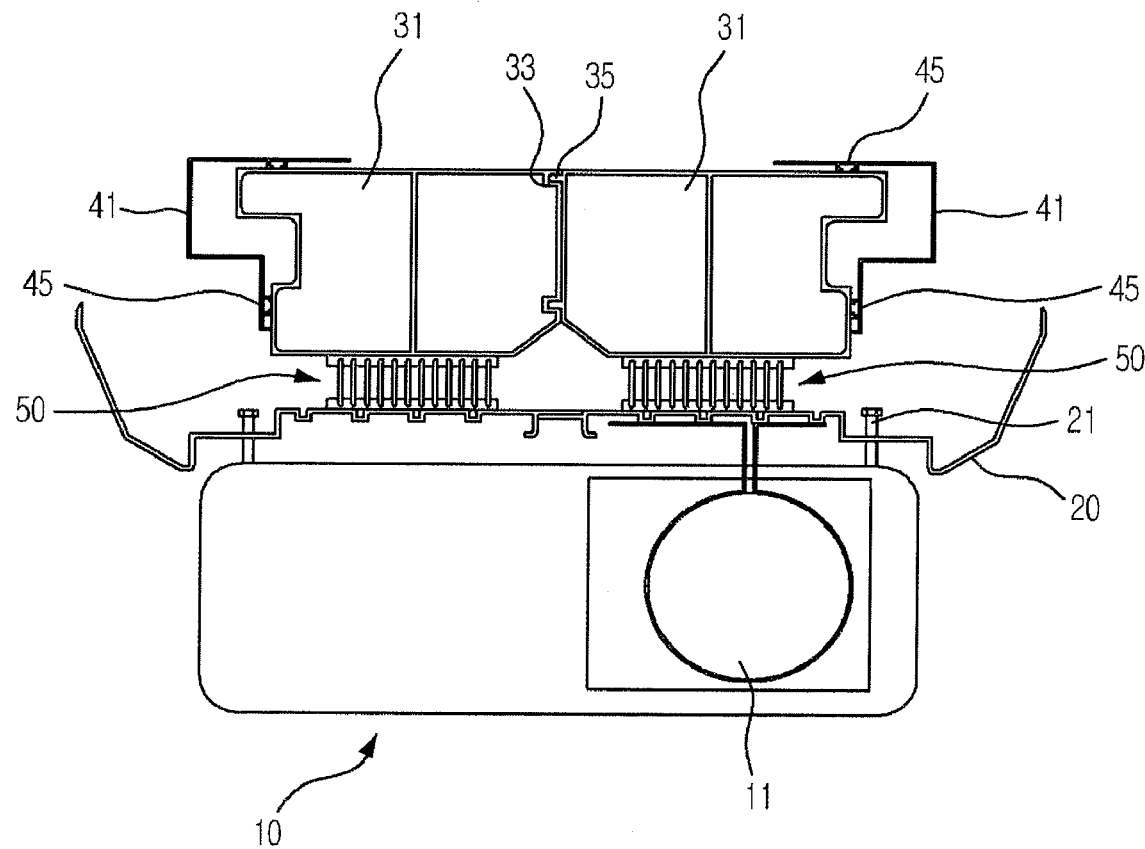
FIG. 3 is a front elevation view illustrating the projection apparatus shown in FIG. 2.
Figure 4:
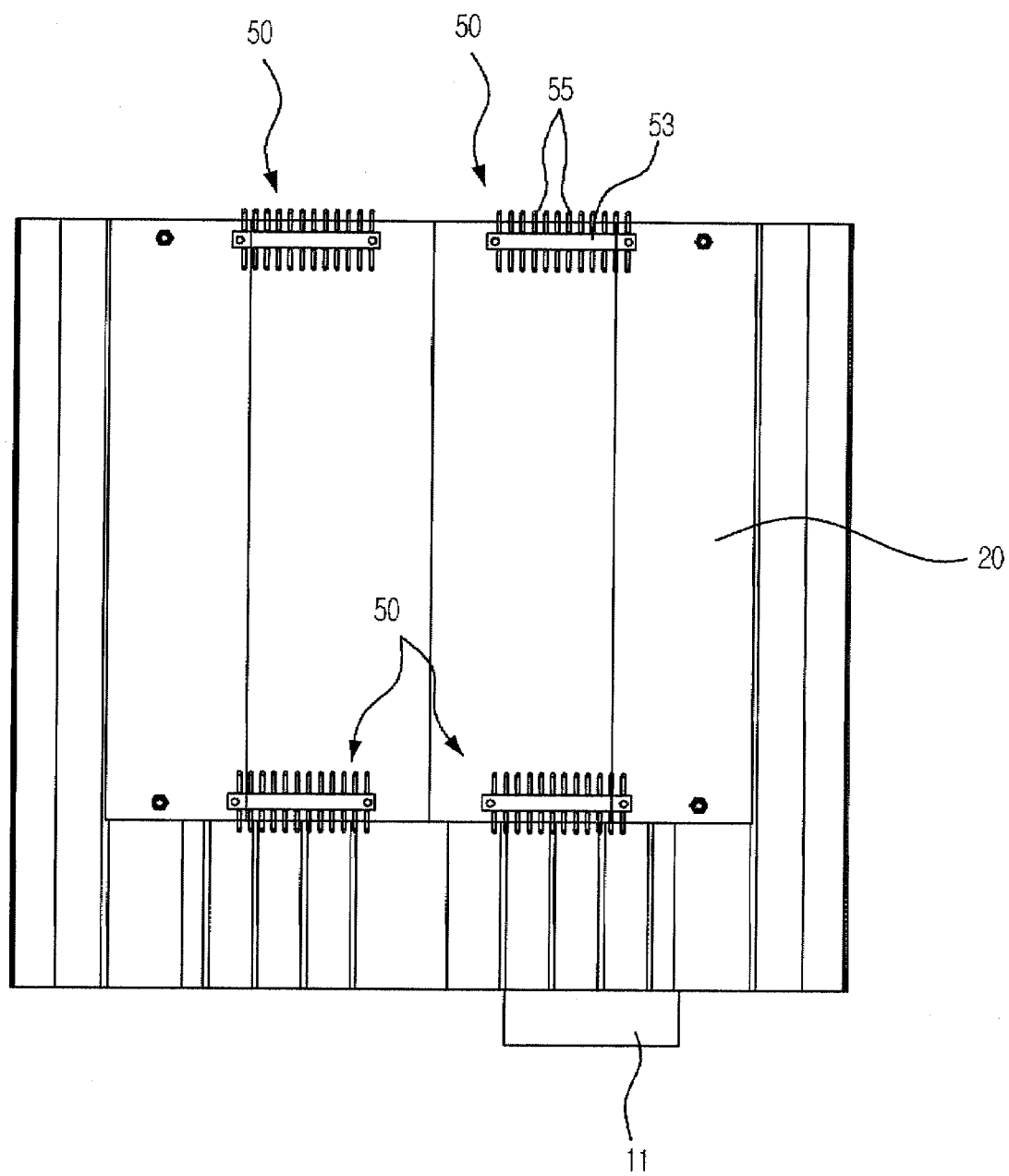
FIG. 4 is a cross-sectional view taken along the line IV-IV shown in FIG. 2.

FIG. 1 is a conceptual view illustrating the usage of the projection apparatus for a vehicle according to the present invention, which is used in a train car.

As shown in FIG. 1, the car 1 to which the present invention is applied includes a screen 5, projection apparatuses 7 and a number of seats 9, which are arranged in one direction.

The screen 5 is attached to a ceiling 3, approximately in the middle of the interior of the car 1, and is formed such that images can be projected onto both side faces thereof.

The projection apparatuses 7 are fixed to the ceiling 3 of the car 1 at right and left positions, spaced apart from each other at a predetermined distance on the basis of the screen 5. The projection apparatuses 7 act to project a stored image onto the screen 5.

While the projection apparatuses 7 generally project the same image, the present invention is not intended to be limited to this case. The respective projection apparatuses 7 may project different images onto the screen 5.

In the car 1, with the screen 5 located in the middle of the car 1, the seats 9 are arranged in oppositely facing directions on both sides of the screen 5.

As shown in FIGS. 2 to 5, the projection apparatus 7 of the present invention includes a projector 10 for projecting an image onto the screen 5, a support bracket 20 supporting the projector 10, a frame 30 attached to the ceiling 3 of the car 1, and vibration absorbers 50 arranged between the support bracket 20 and the frame 30.

The projector 10 is connected with a player (not shown), and a reproduced image is projected onto the screen 5 through a lens 11.

The support bracket 20 is mounted on the top face of the projector 10 to support the projector 10. The projector 10 and the support bracket 20 are fastened to each other via bolts 21.

The frame 30 arranged above the support bracket 20 is attached to the ceiling 3 of the car 1.

The frame 30 includes a pair of frame bodies 31 arranged above the support bracket 20 and attached to the ceiling 3 of the car 1 and a pair of housings 41 surrounding side faces and part of an upper part of the frame body 31.

The frame bodies 31 are arranged side by side. Fitting recesses 33 and fitting protrusions 35 are formed on opposing faces of the frame bodies 31. The fitting recesses 33 and the fitting protrusions 35 are formed along the length of the frame bodies 31 so that the frame bodies 31 can engage with each other.

The frame body 31 has a hollow box shape in order to reduce the total weight of the projection apparatus 7, which is attached to the ceiling 3 of the car 1. The frame bodies 31 also act to maintain a predetermined interval between the projector 10 and the ceiling 3 of the car 1.

A plurality of vibration-proof rubber pads 45 is arranged between the frame body 31 and the housing 41 in order to attenuate vibrations between the frame body 31 and the housing 41.

The vibration absorbers 50 are arranged between the support bracket 20 and the frames 30, particularly between the support bracket 20 and the frame bodies 31.

The vibration absorbers 50 act to absorb multidirectional vibrations transmitted from the ceiling 3 of the car 1 through the frames 30 to the projector 10.

In this embodiment, the vibration absorbers 50 are arranged respectively in front and rear areas of the frame bodies 31. That is, a total of four (4) vibration absorbers 50 are arranged between the support bracket 20 and the frames 30.

Figure 5:
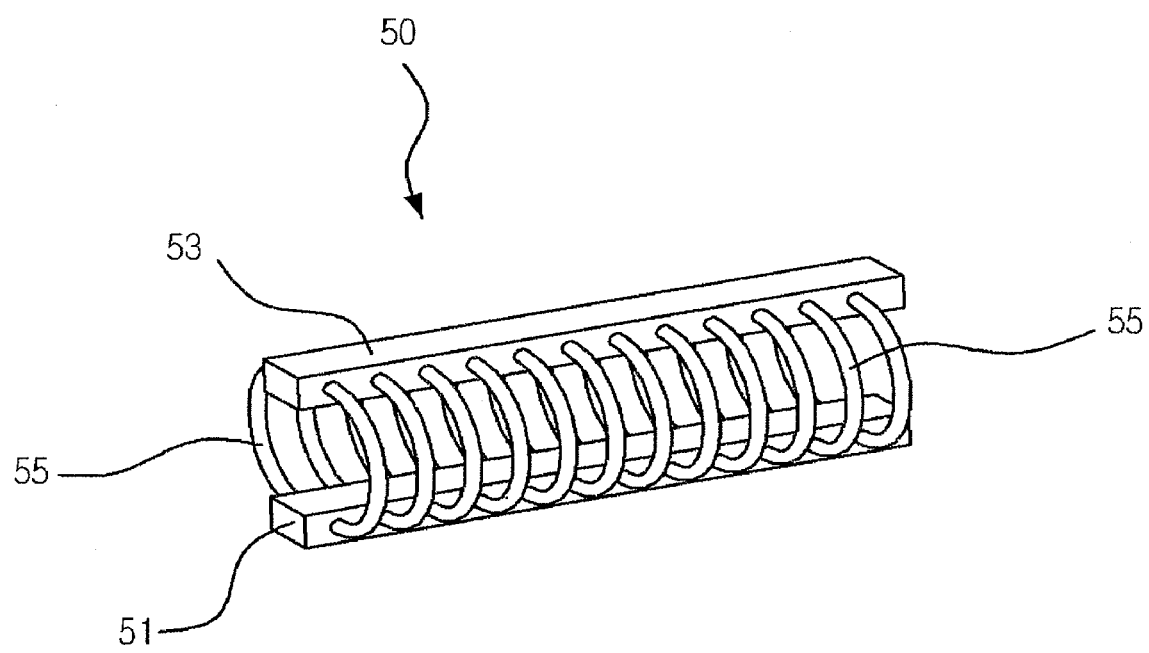
FIG. 5 is a perspective view illustrating the vibration absorber shown in FIG. 2.

As shown in FIG. 5, the vibration absorber 50 includes a first mount block 51 fixed to the support bracket 20, a second mount block 53 fixed to the frame body 31, and a plurality of wire ropes 55 elastically connecting the first mount block 51 with the second mount block 53.

The wire ropes 55 having a predetermined length are curved into an annular configuration so that two ends oppose each other.

The wire rope 55 is inserted through one of the first and second mount blocks 51 and 53 with a predetermined gap therebetween, and is attached to the other one of the first and second blocks 51 and 53. Particularly, opposite ends of the wire rope 55 are attached to the other one of the first and second blocks 51 and 53. The wire rope 55 of the vibration absorber 50 generally has an annular shape or a coil shape.

When vibrations are transmitted from the ceiling 3 of the car 1 to the vibration absorber 50, the wire ropes 55 elastically connecting the first mount block 51 with the second mount block 53 come to bend and stretch, thereby absorbing and attenuating multidirectional vibration. Hence, it is possible to support the projector 10 so that it does not shake.

Since the vibration absorber 50 has larger elastic strength and greater vibration absorbing force than the existing vibration-proof pads, it is possible to obtain an effective vibration-proof function.

Some factors of the wire ropes 55, such as number, elastic strength and size, can be determined by, for example, the weight of the projector 7 and the estimated force of the vibrations.

The wire ropes 55 are preferably made of stainless steel, which has excellent corrosion resistance and endurance, so that they can be used semi-permanently.

With this arrangement when multidirectional vibrations are transmitted from the ceiling 3 of the car 1 through the frames 30 to the projector 10 while the car 1 is being driven, the wire ropes 55 of the vibration absorber 50, arranged between the support bracket 20 and the frames 30, come to bend and stretch, thereby absorbing and attenuating multidirectional vibrations. This as a result can prevent the projector 10 from shaking in order to constantly maintain the projector 10 in a stable position.

Since the projector 10 does not shake, passengers in the car 1 can enjoy watching video content with less fatigue to the eye, thereby enjoying video content such as movies during a long travel. Accordingly, the passengers can feel at ease and be comfortable without becoming bored on long trips.

Furthermore, the incidence of breakage of components of the projector 10 is reduced, thereby prolonging the lifetime of the projector 10.

While the foregoing embodiment has been described with respect to the train car as a vehicle, it should be appreciated that the concept of the present invention is, of course, applicable to other types of vehicles, such as automobiles.

While the present invention has been described with reference to the particular illustrative embodiments and the accompanying drawings, it is not to be limited thereto, but will be defined by the appended claims. It is to be appreciated that those skilled in the art can substitute, change or modify the embodiments into various forms without departing from the scope and spirit of the present invention.

The invention claimed is:

1. A projection apparatus for a vehicle, comprising:
   a projector for projecting an image onto a screen;
   a support bracket supporting the projector;
   a frame attached to a ceiling of the vehicle; and
   a vibration absorber arranged between the support bracket and the frame, the vibration absorber including a plurality of wire ropes for absorbing multidirectional vibrations, which are transmitted from the vehicle through the frame to the projector.

2. The projection apparatus according to claim 1, wherein the vibration absorber further includes a first mount block fixed to the support bracket and a second mount block fixed to the frame, and
   wherein the wire ropes, having an annular shape, elastically connect the first mount block with the second mount block.

3. The projection apparatus according to claim 1, wherein the wire ropes are made of stainless steel.

4. The projection apparatus according to claim 2, wherein the wire ropes are made of stainless steel.

* * * * *

UNITED STATES PATENT AND TRADEMARK OFFICE
CERTIFICATE OF CORRECTION

PATENT NO. : 7,661,822 B2
APPLICATION NO. : 11/956155
DATED : February 16, 2010
INVENTOR(S) : Mi Sun Park et al.

It is certified that error appears in the above-identified patent and that said Letters Patent is hereby corrected as shown below:

Title page, item "(73)   Assignee: Korea Railroad Corporation (KP)"

Should read:

-- (73)   Assignee: Korea Railroad Corporation (KP) and Kim, Jong Chan (KP) --

Signed and Sealed this

Eighth Day of June, 2010

David J. Kappos
*Director of the United States Patent and Trademark Office*